July 2, 1929.                H. M. STOLLER                1,719,492
REGULATOR SYSTEM
Filed Jan. 25, 1923
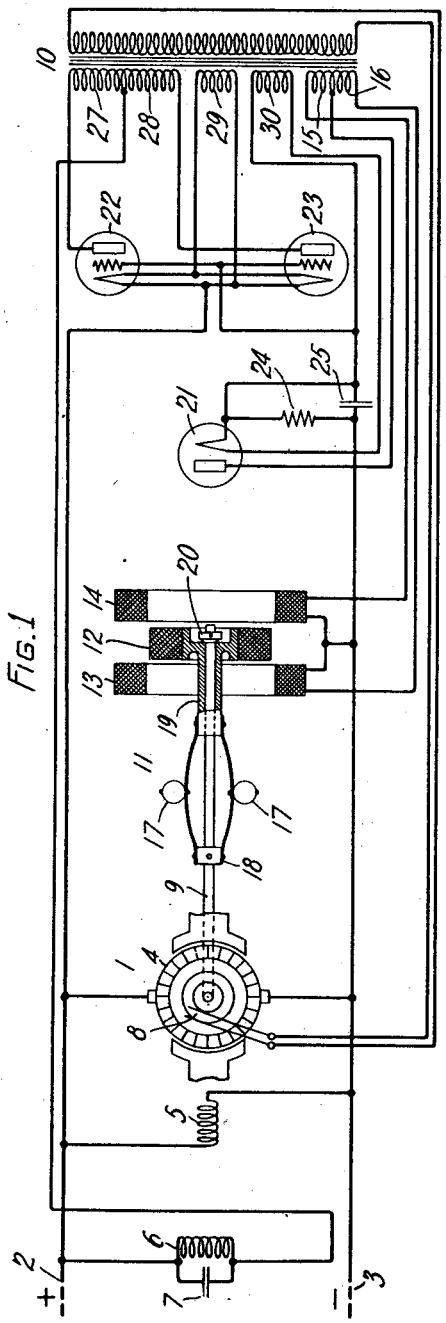
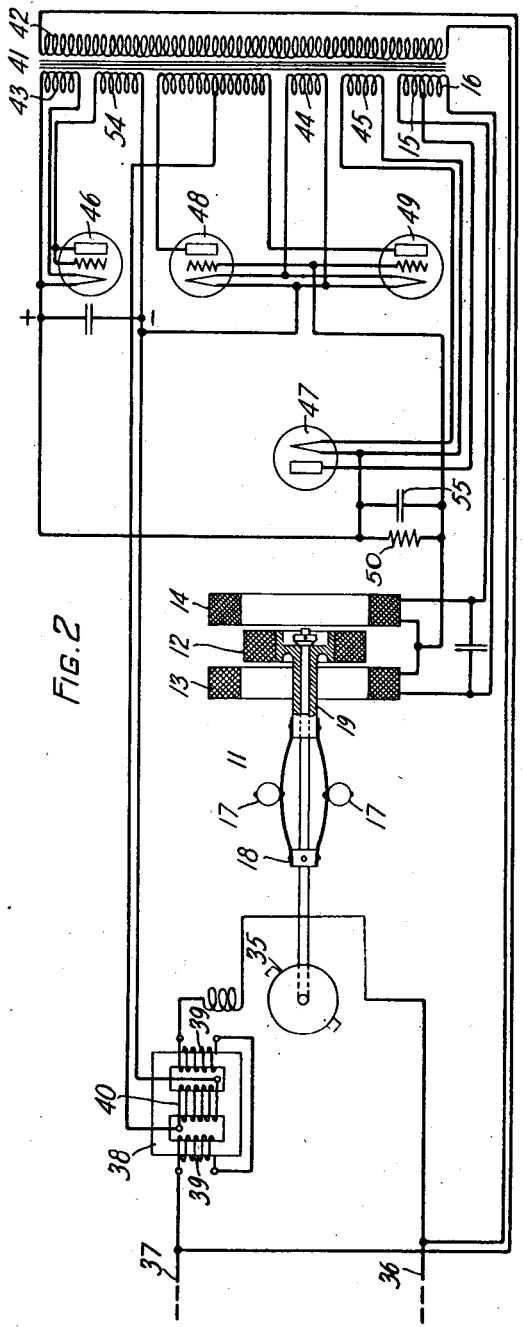
INVENTOR
HUGH M. STOLLER
BY H. O. Burgess
ATTORNEY Patented July 2, 1929.

1,719,492

UNITED STATES PATENT OFFICE.

HUGH M. STOLLER, OF MOUNTAIN LAKES, NEW JERSEY, ASSIGNOR TO BELL TELEPHONE LABORATORIES, INCORPORATED, OF NEW YORK, N. Y., A CORPORATION OF NEW YORK.

REGULATOR SYSTEM.

Application filed January 25, 1928. Serial No. 249,365.

This invention relates to regulator systems and particularly to regulator systems for controlling the speed of motors by electric discharge devices independently of moving contact members.

One object of this invention is to provide a speed regulator system with a centrifugal governor operated by the motor for controlling thermionic tube circuits to govern the motor and maintain the speed thereof substantially constant.

Another object of the invention is to provide a motor with a speed regulator system that shall control a Wheatstone bridge circuit by inductive means independently of moving contact members for governing thermionic means to control the motor and maintain the speed thereof substantially constant.

A further object of the invention is to provide a motor speed regulator system having a centrifugal governor operated according to the motor speed for inductively controlling the arms of a Wheatstone bridge circuit which in turn control thermionic means for governing the current flowing through a regulating coil for the motor to maintain the motor speed substantially constant.

In providing either a direct current or an alternating current motor with a speed regulator it is very desirable to avoid the use of moving contact members. Furthermore, it is very desirable to have the regulation continuous and steady in operation rather than intermittent as is necessary where moving contact members are included as a part of the regulator system. When moving contact members are employed in a regulator system readjustment of the contact members and of the control member therefor is required at times by reason of wear.

The disclosed regulator system effects control of the motor which may be either a direct current motor or an alternating current motor, by means which operates entirely independently of moving contact members. Furthermore, the regulation is effected in a continuous and steady manner so as not to be intermittent.

More specifically, the regulator system comprises a Wheatstone bridge circuit having the arms thereof unbalanced according to change in speed of the motor. The bridge circuit is preferably controlled by a centrifugal governor which is operated according to the motor speed. The centrifugal governor carries a short-circuited coil or a copper ring which is adapted to move in the field of two coils forming two arms of the bridge circuit. In a system for controlling a direct current motor the coils forming the four arms of the bridge circuit are connected to two slip rings joined to the motor armature winding so as to be supplied with an alternating current. In a system for controlling an alternating current motor the coils forming the arms of the bridge circuit are connected to the supply circuit for the motor.

The unbalanced current from the bridge circuit is rectified and impressed on a coupling resistance element. In the control of a direct current motor the resistance element also has potential impressed thereon from the motor supply circuit in opposition to the potential from the bridge circuit. In the control of an alternating current motor rectified current from the alternating current supply circuit is connected to the resistance element to oppose the potential from the bridge circuit. The coupling resistance controls the potential on the grids of two parallel connected thermionic tubes which control the motor speed. In the control of a direct current motor the thermionic tubes control the current flow through a regulator field winding to maintain the motor speed substantially constant. In the control of an alternating current motor the thermionic tubes control an inductance means in the motor supply circuit to maintain the motor speed substantially constant.

The coil or ring which is moved by the centrifugal governor in the field of two coils of the Wheatstone bridge circuit, is initially positioned to maintain the bridge circuit balanced and prevent any output to the coupling resistance. This initial position is fixed by providing a stop to limit the contraction of the centrifugal governor. When the moving coil or ring is in the initial position and the bridge circuit balanced, the grids of the thermionic amplifier tubes in a regulator system for a direct current motor are maintained negative to prevent current flow through the regulating field winding of the direct current motor. In a regulator system for an alternating current motor the grids of the thermionic amplifier tubes are normally maintained positive to permit current flow through the direct current winding of the inductance means associated with the alternating current motor. As the speed of the motor increases above normal the moving coil or ring is moved to unbalance the bridge circuit. The unbalanced current from the bridge reduces the negative potential on the grids of the thermionic tubes in the control system for a direct current motor to permit current to flow through the regulating field winding and reduce the motor speed. In a regulator system for an alternating current motor the positive potential on the grids of the amplifier tubes is reduced to reduce the current flow through the direct current winding of the inductive means and reduce the motor speed.

Any hunting action by the regulator system may be prevented by any suitable anti-hunting means applied to the centrifugal governor. Such anti-hunting means may be of the tangential inertia type or the type having an oil dash pot.

In the accompanying drawing, Figure 1 is a diagrammatic view of a regulator system constructed according to the invention for a direct current motor.

Fig. 2 is a diagrammatic view of a regulator system for an alternating current motor.

Referring to Fig. 1 of the drawing, a regulator system is shown for controlling the speed of a direct current motor 1. The motor which is connected across conductors 2 and 3, comprises an armature 4, a shunt field winding 5 and a regulating field winding 6. A condenser 7 is connected across the regulating field winding 6 to smooth out the ripples in the current. Slip rings 8 are provided on the armature shaft 9 for supplying an alternating current from the motor armature winding to a transformer 10.

A centrifugal governor 11 mounted on the armature shaft, is provided for operating a coil 12 to vary the operation of a Wheatstone bridge comprising coils 13, 14, 15 and 16. The centrifugal governor comprises weight members 17 which are mounted on a stationary sleeve member 18 and a movable sleeve member 19. The movable sleeve member 19 carries the coil 12 which in normal position is located between the two coils 13 and 14 of the Wheatstone bridge. In the released position of the centrifugal governor and when the motor is operating below normal speed, the movable sleeve 19 is held against a stop member 20 on the motor shaft 9. The coil 12 may if so desired be formed as a ring of any suitable conducting material. The transformer 10 supplies current from the slip rings on the motor 1 to a rectifier tube 21 and two amplifier tubes 22 and 23 for controlling the current flow through the regulating field winding 6.

Assuming the motor 1 to be connected across the supply conductors 2 and 3 as shown in the drawing, the speed of the motor will be accelerated until the centrifugal governor 11 moves the coil 12 with respect to the two coils 13 and 14. Upon movement of the coil 12 the Wheatstone bridge comprising the coils 13, 14, 15 and 16 is unbalanced for impressing a potential across a coupling resistance 24. The coils 15 and 16 not only form two arms of the Wheatstone bridge but also form a secondary winding of the transformer 10. Current is thus obtained from the motor 1 through the transformer 10 for impressing a potential on the coupling resistance 24 in accordance with the speed of the motor. One terminal of the coupling resistance 24 is connected to the bridge circuit between the coils 13 and 14 and the other terminal thereof is connected through the rectifier tube 21 to a point on the bridge circuit between the coils 15 and 16. A condenser 25 is connected across the coupling resistance 24 in order to smooth out any ripples in the current flowing therethrough. The input circuits of the amplifier tubes 22 and 23 are connected in parallel across the supply conductors 2 and 3 and the coupling resistance 24. The potential impressed on the coupling resistances 24 from the supply conductors 2 and 3 opposes the potential impressed on the coupling resistance from the Wheatstone bridge circuit. Normally the supply conductors 2 and 3 impress a potential on the coupling resistance to hold the grids of the amplifier tubes 22 and 23 negative so as to limit the space current flow through such tubes. On the other hand, the potential impressed on the coupling resistance 24 from the bridge circuit tends to render the grids of the tubes 22 and 23 less negative or positive in order to increase the space current flow through the tubes. The output circuits of the tubes 22 and 23 are connected in parallel through secondary windings 27 and 28 of the transformer 10 to the regulating field winding 6. The parallel connection of the output circuits to the secondary windings 27 and 28 serves to effect full wave rectification of the current obtained from the slip rings 8 through the transformer 10. A secondary winding 29 of transformer 10 is provided for supplying heating current to the filaments of the tubes 22 and 23 and a secondary winding 30 of the transformer 10 is provided for supplying heating current to the filament of the rectifier tube 21.

The stop member 20 on the armature shaft 9 is set so as to prevent movement of the coil 12 when the speed of the motor is reduced below normal speed. When the speed of the motor increases above normal speed the coil 12 is moved with respect to the coils 13 and 14 which form arms of the Wheatstone bridge circuit. Upon movement of the coil 12 the Wheatstone bride circuit is unbalanced to impress a potential on the coupling resistance 24 which opposes the potential impressed on the coupling resistance from the supply conductors 2 and 3. The supply conductors as above set forth normally maintain a negative potential on the grids of the tubes 22 and 23 and such negative potential is reduced by the potential impressed on the coupling resistance 24 from the unbalanced Wheatstone bridge circuit. The reduction in the negative potential on the grids of the amplifier tubes 22 and 23 increases the space current flow through the amplifier tubes and accordingly increases the current flow through the regulating field winding 6. An increase in the current flow through the field winding 6 reduces the speed of the motor and in such manner tends to maintain the motor speed substantially constant.

Hunting on the part of the regulator is prevented by applying any well known antihunting means to the centrifugal governor. Such anti-hunting means may be of the tangential inertia type or of the type having an oil dash pot.

Referring to Fig. 2 of the drawing, an alternating current motor 35 is shown connected across an alternating current supply circuit 36 and 37 through a variable reactor 38. The variable reactor comprises two alternating current windings 39 and a direct current winding 40 which are wound on one core member. The current flowing through the direct current winding 40 is controlled in a manner hereinafter set forth for varying the inductance of the reactor to vary the potential impressed on the motor 35. The centrifugal governor and the Wheatstone bridge circuit shown in Fig. 2 of the drawing are similar in construction and operation to the centrifugal governor and Wheatstone bridge circuit shown in Fig. 1 of the drawing and similar parts will be indicated by like reference characters.

The coils 15 and 16 of the Wheatstone bridge circuit form a secondary winding of a transformer 41. The primary winding 42 of the transformer is connected across the alternating current supply conductors 36 and 37. Three secondary windings 43, 44 and 45 are provided for supplying heating current to the filaments of two rectifier tubes 46 and 47 and two amplifier tubes 48 and 49. The rectifier tube 47 serves to impress a direct current potential on a coupling resistance 50 in accordance with unbalancing of the Wheatstone bridge circuit. The rectifier tube 46 serves to impress a rectified potential from the transformer 41 on the coupling resistance 50 in opposition to the potential impressed on such coupling resistance from the bridge circuit. The input circuits of the amplifier tubes 48 and 49 are connected in parallel across the coupling resistance 50. Normally the current from the rectifier tube 46 impresses a positive potential on the grids of the tubes 48 and 49 in order to permit a large space current flow through the amplifier tubes for energizing the direct current winding 40 of the variable reactor 38. Such action permits acceleration of the motor 35. Upon unbalancing of the bridge circuit, however, a potential is impressed on the coupling resistance 50 for opposing the positive potential normally maintained on the grids of the amplifier tubes 48 and 49. The grids of the tubes are then made negative or less positive for reducing the space current flow through the tubes 48 and 49 to reduce the current supplied to the variable reactor 38 from the transformer 41. In such a manner the motor speed is reduced.

Assuming the motor 35 is connected across the supply conductors as in Fig. 2 of the drawing, the motor speed is accelerated to a point above normal speed. When the motor reaches normal speed, the centrifugal governor 11 is operated to move the coil or ring 12 with respect to the coils 13 and 14 which form arms of the Wheatstone bridge circuit. Upon movement of the coil 12, the Wheatstone bridge circuit is unbalanced to impress a potential on the coupling resistance 50 which opposes the potential obtained from the supply conductors through the rectifier 46. A condenser 55 is connected across the coupling resistance 50 to smooth out any ripples in the current. The potential thus impressed on the coupling resistor 50 from the Wheatstone bridge circuit reduces the positive potential on the grids of the tubes 48 and 49 and thus reduces the energization of the winding 40 of the inductive reactor 38. Consequently the excitation of the reactor device is reduced to reduce the motor speed.

Any well known anti-hunting device may be applied to the centrifugal governor 11 as above set forth in discussing the centrifugal governor in Fig. 1. Such anti-hunting devices are old and well known in the art, relating to centrifugal governors and a description thereof is deemed unnecessary.

Modifications in the systems, in the arrangement and location of parts may be made within the spirit and scope of the invention and such modifications are intended to be covered by the appended claims.

What is claimed is:

1. A regulator system for a motor comprising a Wheatstone bridge circuit, inductive means mechanically operated by the motor for unbalancing said bridge circuit in accordance with the motor speed, and means for controlling the motor speed according to the unbalancing of said bridge circuit.

2. A speed regulator system for a motor comprising a Wheatstone bridge circuit, means operated according to the motor speed and having an inductive connection to said bridge circuit for controlling the bridge circuit according to the motor speed, and means comprising an electric discharge device for controlling the motor according to the unbalance current flowing through the Wheatstone bridge circuit.

3. A speed regulator system for a motor, comprising a Wheatstone bridge circuit, centrifugal means operated according to the speed of said motor, inductive means operated by said centrifugal means for controlling said bridge circuit according to the motor speed, and means comprising an electric discharge device governed by said bridge circuit for controlling the motor to maintain the speed thereof substantially constant.

4. In a speed regulator system for a motor, a centrifugal governor operated according to the speed of the motor, a Wheatstone bridge circuit, means for energizing the bridge circuit from the motor armature, inductive means operated by said governor for unbalancing said bridge circuit according to the motor speed and means comprising a thermionic tube controlled by said bridge circuit for governing the motor to maintain the speed thereof substantially constant.

5. In a speed regulator system for a motor, a centrifugal governor operated according to the speed of the motor, a regulating field magnet winding for said motor, means comprising a Wheatstone bridge circuit for controlling the current flow in said regulating field winding, and inductive means mechanically operated by said governor for controlling said bridge circuit to maintain the motor speed substantially constant.

6. In a speed regulator system for a motor, a centrifugal governor operated according to the speed of the motor, a Wheatstone bridge circuit, inductive means operated by said governor for controlling said bridge circuit in accordance with the motor speed, a resistance element, means for impressing a potential on said resistance element according to the unbalancing of said bridge circuit, a regulating field winding for said motor, and means comprising an electric discharge device having the grid element thereof controlled by the potential on said resistance element for controlling said regulating field to maintain the motor speed substantially constant.

7. A regulating system for a motor comprising a centrifugal governor operated according to the motor speed, a Wheatstone bridge circuit having the coils thereof supplied with alternating current from the motor armature winding, inductive means operated by said governor for unbalancing the bridge circuit according to variations in the motor speed, a resistance element, means for rectifying and impressing the unbalanced current from said bridge circuit on said resistance element, a regulating field winding for said motor, and means comprising a thermionic tube having the grid element thereof controlled by the potential on said resistance element for governing the regulating field winding.

8. A speed regulator system for a motor comprising a regulating field winding, a supply circuit connected to the motor, a centrifugal governor operated according to the motor speed, a Wheatstone bridge circuit, inductive means operated by said centrifugal governor for controlling the bridge circuit, a resistance element, means for impressing a direct current potential on said resistance element according to the unbalancing of said bridge circuit, and two thermionic tubes having the output circuits connected in parallel to said field winding and the input circuits connected in parallel across said resistance in series with the motor supply circuit, the potential impressed on the resistance element from the bridge circuit opposing the potential from the supply circuit.

In witness whereof, I hereunto subscribe my name this 24 day of January, 1928.

HUGH M. STOLLER.